(12) United States Patent
Rogoll et al.

(10) Patent No.: US 8,467,196 B2
(45) Date of Patent: Jun. 18, 2013

(54) MODULAR FIELDBUS SEGMENT PROTECTOR

(75) Inventors: Gunther Rogoll, Mannheim (DE); Renato Kitchener, West Sussex (GB)

(73) Assignees: Pepperl + Fuchs GmbH (DE); Phoenix Contact GmbH & Co. KG (DE)

( * ) Notice: Subject to any disclaimer, the term of this patent is extended or adjusted under 35 U.S.C. 154(b) by 820 days.

(21) Appl. No.: 11/988,950

(22) PCT Filed: Jul. 21, 2006

(86) PCT No.: PCT/GB2006/002758
§ 371 (c)(1),
(2), (4) Date: Mar. 23, 2009

(87) PCT Pub. No.: WO2007/010289
PCT Pub. Date: Jan. 25, 2007

(65) Prior Publication Data
US 2009/0215324 A1    Aug. 27, 2009

(30) Foreign Application Priority Data
Jul. 21, 2005   (GB) .................................. 0514906.7

(51) Int. Cl.
*H01R 9/00* (2006.01)
(52) U.S. Cl.
USPC .......................................................... 361/824
(58) Field of Classification Search
USPC ......................................................... 361/824
See application file for complete search history.

(56) References Cited

U.S. PATENT DOCUMENTS

| | | | | |
|---|---|---|---|---|
| 3,475,561 A | * | 10/1969 | Greene et al. | 370/488 |
| 3,970,898 A | * | 7/1976 | Baumann et al. | 361/68 |
| 4,313,147 A | * | 1/1982 | Uchida et al. | 361/119 |
| 4,709,365 A | * | 11/1987 | Beale et al. | 714/4.1 |
| 4,729,086 A | * | 3/1988 | Lethellier | 363/65 |
| 5,052,935 A | * | 10/1991 | James et al. | 439/49 |
| 5,267,880 A | * | 12/1993 | Tamm | 439/620.29 |

(Continued)

FOREIGN PATENT DOCUMENTS

| | | |
|---|---|---|
| DE | 298 23 525 U1 | 9/1999 |
| GB | 2296609 A  * | 7/1996 |
| WO | 02/099663 | 12/2002 |
| WO | WO-2004/075356 A | 9/2004 |

OTHER PUBLICATIONS

Foundation Fieldbus Application Guide 31,25 kbit/s Intrinsically Safe Systems, AG-163 Revision 2.0 published 2004.

(Continued)

*Primary Examiner* — Timothy Thompson
*Assistant Examiner* — Nathan Milakovich
(74) *Attorney, Agent, or Firm* — Lerner, David, Littenberg, Krumholz & Mentlik, LLP

(57) ABSTRACT

A modular Fieldbus segment protector comprising a support means provided with trunk connection means, a trunk connection bus and a plurality of spur outlets, in which autonomous fault isolation means are removably mounted on the support means between the trunk connection bus and any one or more of the plurality of spur outlets.

9 Claims, 1 Drawing Sheet

U.S. PATENT DOCUMENTS

Figure 1:
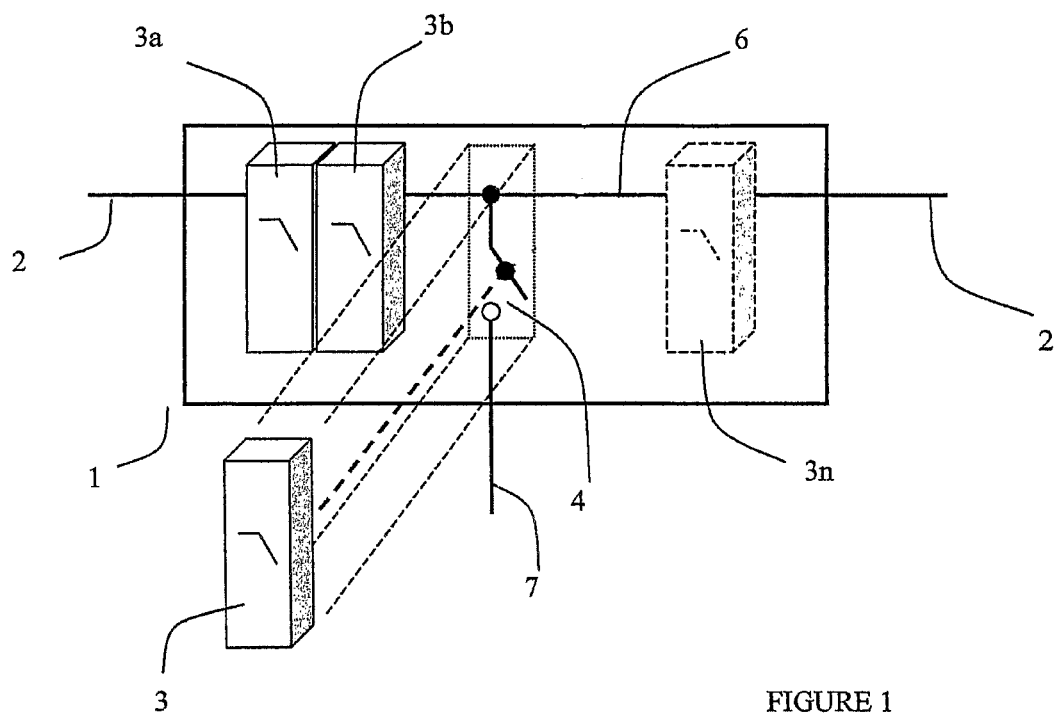

| | | | |
|---|---|---|---|
| 5,509,066 A * | 4/1996 | Saligny | 379/327 |
| 5,757,265 A | 5/1998 | Kogure et al. | |
| 5,831,805 A | 11/1998 | Sekine et al. | |
| 6,166,836 A * | 12/2000 | Crameri et al. | 398/18 |
| 6,275,881 B1 * | 8/2001 | Doege et al. | 710/301 |
| 6,870,722 B2 * | 3/2005 | Strauser et al. | 361/93.9 |
| 2002/0021558 A1 | 2/2002 | Schwarz et al. | |
| 2002/0163254 A1 * | 11/2002 | Novinsky et al. | 307/43 |
| 2002/0169582 A1 | 11/2002 | Eryurek et al. | |
| 2002/0184410 A1 * | 12/2002 | Apel et al. | 710/5 |
| 2003/0016103 A1 | 1/2003 | Haudry et al. | |
| 2003/0218389 A1 * | 11/2003 | Bianchi | 307/126 |
| 2011/0149527 A1 * | 6/2011 | Esposito De La Torella | 361/730 |

OTHER PUBLICATIONS

Schmieder et al., "Furios: Fieldbus and Remote I/O—a system comparison", apt Automatisierungstechnische Praxis 44 (2002), Edition 12, pp. 61-70.

"Freedom to choose. Power to Integrate", Fieldbus Report: Partners, Products & Technology for Connecting the Enterprise, vol. 4.2.05, Sep. 36PP.

"Freedom to choose. Power to Integrate", Fieldbus Report: Partners, Products & Technology for Connecting the Enterprise, vol. 3.2.04, Sep. 32PP.

* cited by examiner

MODULAR FIELDBUS SEGMENT PROTECTOR

This invention relates to a Modular Fieldbus Segment Protector for use in connecting electrical devices to a trunk connection bus.

Known Fieldbus segment protection generally comprises a block containing a plethora of spur outlets. This is not an economic or versatile configuration as many spur outlets are often left unused.

It is possible to use T couplers but these increase the footprint size, increase the number of terminal connections and generally increases the cost of manufacture and use.

In addition, the known types of block couplers do not allow the live replacement of any faulty spur autonomous components. In order to remove a spur module the trunk connection must be broken.

The present invention is intended to overcome some of the above problems.

Therefore, according to a first aspect of the present invention a modular Fieldbus segment protector comprises a support means provided with trunk connection means, a trunk connection bus and a plurality of spur outlets, in which autonomous fault isolation means are removably mounted on the support means between the trunk connection bus and any one or more of the plurality of spur outlets.

Therefore, the invention provides a modular system in which self-contained fault isolation means can be utilised where and when necessary by only being applied to particular spur outlets. As the fault isolation means are removable from the support means, they can also be moved about thereon and applied to the spur outlets as desired.

In addition, with this arrangement each spur outlet is provided with its own autonomous fault isolation means.

It will be appreciated that the invention includes a modular Fieldbus segment protector in which removal of a fault isolation means from between the trunk connection bus and a spur outlet will isolate the spur outlet, and any spur connected thereto, from the trunk connection bus.

However, in a preferred embodiment of the invention secondary switch means can be provided between the trunk connection bus and one or more of the plurality of spur outlets. Each secondary switch means can be adapted to connect its spur outlet to the trunk connection bus when a fault isolation means is not mounted between the trunk connection bus and that spur outlet.

The secondary switch means can be adapted to automatically connect its spur outlet to the trunk connection bus when a fault isolation means is removed from between them, and to automatically break that connection when a fault isolation means is returned to between them.

With this arrangement the removal of one of the fault isolation means does not isolate the spur outlet, and therefore any spur connected thereto. As such a faulty fault isolation means can be removed and replaced without isolating a spur and interrupting electrical supply to a device connected thereto.

In one arrangement the secondary switch means can be provided with deactivation means, the operation of which prevents the secondary switch means connecting its spur outlet to the trunk connection bus when a fault isolation means is not mounted between them. The deactivation means can be manual or otherwise.

Thus, if it is desired to isolate a particular spur outlet, and a spur mounted thereon, then the deactivation means can be operated and the fault isolation means can be removed from between the spur outlet and the trunk connection bus. Also, if a fault isolation means is not present, and the secondary switch means is connecting the spur outlet to the trunk connection bus, then the deactivation means can be operated at any time to isolate the spur.

Preferably each one of the plurality of spur outlets is provided with a secondary switch means of any of the kinds described above.

The fault isolation means can comprise an electrical circuit adapted to transition to high impedance if a short circuit or low resistance fault occurs at a spur. There are several known types of electrical circuit which can be used.

The trunk connection means can be any known connector, such that the modular Fieldbus segment protector could be retrofit to an existing Fieldbus trunk. Alternatively, the trunk connection bus can be connected to a trunk by being integrally formed thereon. Such an arrangement would be suitable if the modular Fieldbus segment protector of the invention were integrated into a new Fieldbus trunk system.

Likewise, the spur outlets can be any know connectors, such that the modular Fieldbus segment protector can be retrofit to an existing Fieldbus trunk, and such that different spurs can be connected and disconnected thereto as desired in use. Alternatively, spurs can be integrally formed onto the support means, and as such the spur connectors can comprise the connection points between the spurs and the support means. Such an arrangement would be suitable if the modular Fieldbus segment protector of the invention were integrated into a Fieldbus trunk system in which the spurs were not disconnectable.

The support means can comprise a backplane carrying the trunk connection bus, the removable fault isolation means and the plurality bf spur outlets.

However in a more advantageous construction of the invention, the support means can comprise a plurality of separate backplanes each carrying a trunk connection bus and a spur outlet. One or more of the backplanes can also carry a fault isolation means, according to the invention.

With this construction the trunk connection means of the invention can comprise connectors which can connect the backplanes to a trunk. In addition, the connectors can also be adapted to connect one backplane to another, so any number of backplanes can be daisy-chained together between connections to the trunk. Such connectors might be so-called D connectors. With this arrangement a modular trunk connection bus runs through all the backplanes, and a separate spur outlet is provided at each backplane.

This arrangement allows any number of backplanes to be incorporated into a Fieldbus system as required. This modular system eliminates the occurrence of redundant spur outlets.

The support means of the invention can also be adapted to support other devices. For example, any device could be mounted between the trunk connection means and the trunk connection bus to serve any particular purpose. Such a device might be a simple direct spur connection module without any fault isolation features, or it could be a passive device with a PCB connection. Other types of additional circuitry could also be included here, for example voltage limiting components or modules, and/or additional spur protection electronics.

As stated above, the modular Fieldbus segment protector of the invention could be fully integrated into a Fieldbus system.

Therefore, according to a second aspect of the present invention a Fieldbus system is provided with a modular Fieldbus segment protector comprising a support means provided with trunk connection means, a trunk connection bus and a plurality of spur outlets, in which autonomous fault isolation means are removably mounted on the support means between the trunk connection bus and any one or more of the plurality of spur outlets.

Figure 2:
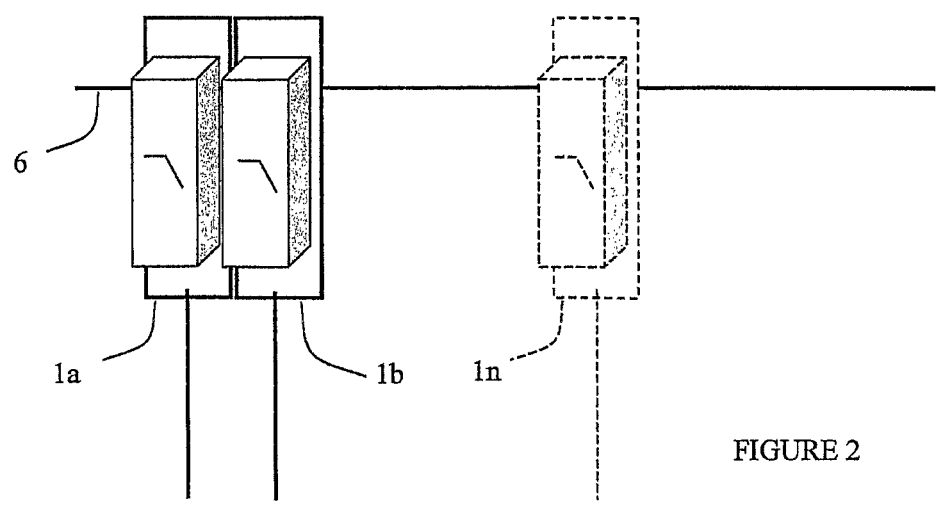

Two embodiments of the invention will now be described by way of example and with reference to the accompanying drawings, in which:

FIG. 1 is a diagrammatic view of a first modular Fieldbus segment protector according to the present invention; and, FIG. 2 is a diagrammatic view of a second modular Fieldbus segment protector according to the present invention.

(In the following examples terminators are not included, but it will be appreciated that they may be inserted at any point in the system.)

As shown in FIG. 1 a modular Fieldbus segment protector comprises a support means, in the form of backplane 1, provided with trunk connection means, a trunk connection bus 6 and a plurality of spur outlets. (In the example shown the backplane 1 is simply mounted on a trunk 2, and as such the "trunk connection means" in this case comprises the incoming and outgoing trunk wires. In addition, the spurs, only one of which 7 is shown, are simply connected to the backplane 1, and as such the "spur outlets" of the invention comprise those connection points.) Autonomous fault isolation means, in the form of spur isolators 3, 3a, and 3b to 3n are removably mounted on the support means (1) between the trunk connection bus 6 and any one or more of the plurality of spur outlets, as is illustrated in FIG. 1.

Secondary switch means in the form of shunt switches, only one of which 4 is visible, are provided between the trunk connection bus 6 and the spurs 7. The shunt switches 4 automatically connect the spurs 7 to the trunk connection bus 6 when a spur isolator 3 is removed from between them. This connection is broken when a spur isolator 3 is returned. The means by which the shunt switches 4 automatically connect the spurs 7 to, and disconnect the spurs 7 from, the trunk connection bus 6 can be any known trip devices.

The spur isolators 3, 3a and 3b to 3n comprise electrical circuits adapted to transition to high impedance if a short circuit or low resistance fault occurs at a spur 7. Such technology is well known and is not further described here.

In use the spur locators 3, 3a and 3b to 3n connect the spurs 7 to the trunk connection but 6, so that devices (not shown) connected to the spurs 7 are provided with electrical power and can operate.

The spur isolators 3, 3a and 3b to 3n operate to protect the spur 7 and the trunk 2 from any short circuits or breaks which may occur in the system. As the spur isolators 3, 3a and 3b to 3n are autonomous they can isolate separate parts of the system without affecting others.

As the spur isolators 3, 3a and 3b to 3n are removable from the backplane 1 they can be applied to connect particular spurs 7 to the trunk connection bus 6 as required. For example where a spur 7 is not being used, a spur isolator 3, 3a and 3b to 3n is not required and can be utilised elsewhere. This flexibility allows for a targeted, and therefore more economic, use of resources.

If a spur isolator 3, 3a and 3b to 3n is removed from between the trunk connection bus 6 and a particular spur 7, as is shown in FIG. 1, then the shunt switch 4 automatically connects the spur 7 directly to the trunk connection bus 6. As such, a spur isolator 3, 3a and 3b to 3n can be removed from the backplane 1 for whatever reason, and there will be no interruption in electrical supply to the spur 7, and any device connected thereto. This allows for the live removal and replacement of spur isolators 3, 3a and 3b to 3n in use. In particular it prevents devices from being disconnected by accident.

FIG. 2 shows a variation of the invention in which the support means comprises a plurality of separate backplanes 1a and 1b to 1n, each carrying a single trunk connection bus and a spur outlet. In FIG. 2 each backplane 1a and 1b to 1n also carries a spur isolator, and in each case shunt switches as described above are provided.

Each of the backplanes 1a and 1b to 1n is provided with the female part of a D connector at one side, and the male part of a D connector at the opposite side (not shown). As such, each backplane 1a and 1b to 1n can be connected to the trunk, either at an inlet or an outlet, and the backplanes 1a and 1b to 1n can be connected together. Therefore, any number of backplanes can be daisy-chained together between connections to the trunk. In FIG. 2 backplanes 1a and 1b are connected together in such a chain, between connections to the trunk. It will be appreciated that any number of such backplanes can be connected together in this way, and the hashed outline of 1n in FIG. 2 is intended to indicate this capability.

With this arrangement a modular trunk connection bus 6 runs through these backplanes 1a and 1b to 1n, and a separate spur outlet is provided at each backplane 1a and 1b to 1n. It will be appreciated that this arrangement allows any number of backplanes to be incorporated into a Fieldbus system as required, and such a modular system eliminates the occurrence of redundant spur outlets.

As such the modular Fieldbus segment protector shown in FIG. 2 has two levels of modular flexibility. The spur isolators can be removed from the backplanes 1a and 1b to 1n, and moved between them if desired, and in addition, the number of actual spur outlets provided can be adjusted by removing or adding backplanes.

The present invention also includes a Fieldbus system provided with a modular Fieldbus segment protector as described above. This invention is supported by FIG. 1, in which the modular Fieldbus segment protector is integrally mounted on a Fieldbus trunk, and the spurs are integrally mounted on the modular Fieldbus segment protector. Therefore a Fieldbus system according to the second aspect of the present invention is supported by the Figures.

The present invention can be altered without departing from the scope of Claim 1. In particular, in an alternative embodiment (not shown), the modular Fieldbus segment protector is provided with actual trunk connectors, and actual spur connectors, so the modular Fieldbus segment protector is a stand-alone device which can be readily plugged into an existing Fieldbus system.

In another alternative embodiment (not shown) the modular Fieldbus segment protector is not provided with any secondary switch means, such that removal of a fault isolation means from between the trunk connection bus and a spur outlet isolates that spur outlet. Such a version may be preferred in some cases.

In another alternative arrangement (not shown) the secondary switch means are provided with deactivation means, the operation of which prevents the secondary switch means connecting the spur outlets to the trunk connection bus when a fault isolation means is not mounted between them. Such a version provides greater flexibility of use.

In a further alternative embodiments (not shown) the backplanes support other devices, including a simple direct spur connection module without any fault isolation features, and/or a passive device with a PCB connection and/or voltage limiting components or modules and/or additional spur protection electronics.

Thus, Fieldbus segment protection is provided in a modular and flexible fashion, so the required devices can be utilized more effectively. In addition, the Invention provides for removal of Fieldbus segment protection from individual spurs without any interruption in electrical supply. Further, each spur is provided with its own autonomous protection which prevents other parts of the system from being affected by faults.

The invention claimed is:

1. A modular Fieldbus segment protector for mounting between a Fieldbus trunk and Fieldbus spurs connected to the Fieldbus trunk, in which the Fieldbus segment protector comprises a support means provided with trunk connection means for connecting to a Fieldbus trunk, a trunk connection bus and a plurality of spur outlets for connecting to Fieldbus spurs, in which the support means comprises a plurality of separate backplanes each carrying a trunk connection bus and one spur outlet, in which the trunk connection means comprises connectors adapted to connect each of the plurality of backplanes to said Fieldbus trunk, said connectors connecting one backplane to another such that said trunk connection bus runs through said backplanes, and so any number of backplanes are daisy-chainable together, in which one or more of the plurality of backplanes carry an autonomous and self-contained fault isolation means removably mounted thereon, in each case between the trunk connection bus and the particular spur outlet of that backplane, such that the fault isolation means are removable from the backplanes, are movable about between the backplanes, are applied to the spur outlets thereof as required, and can isolate separate spurs of the Fieldbus segment without affecting other spurs.

2. A modular Fieldbus segment protector as claimed in claim 1 in which secondary switch means are provided between the trunk connection bus and one or more of the plurality of spur outlets, in which each secondary switch means is adapted to connect its associated spur outlet to the trunk connection bus when a fault isolation means is not mounted between the trunk connection bus and that spur outlet.

3. A modular Fieldbus segment protector as claimed in claim 2 in which each secondary switch means is adapted to automatically connect its associated spur outlet to the trunk connection bus when a fault isolation means is removed from between the trunk connection bus and that spur outlet, and in which each secondary switch means is adapted to automatically break said connection when a fault isolation means is returned to between the trunk connection bus and that spur outlet.

4. A modular Fieldbus segment protector as claimed in claim 3 in which each secondary switch means is provided with deactivation means, the operation of which prevents the secondary switch means connecting its associated spur outlet to the trunk connection bus when a fault isolation means is not mounted between the trunk connection bus and that spur outlet.

5. A modular Fieldbus segment protector as claimed in claim 4 in which the deactivation means is manually operable.

6. A modular Fieldbus segment protector as claimed in any of claims 2 and 5 in which each one of the plurality of spur outlets is provided with a secondary switch means.

7. A modular Fieldbus segment protector as claimed in claim 1 in which the support means is adapted to support further electronic or electrical Fieldbus devices.

8. A modular Fieldbus segment protector as claimed in claim 7 in which a direct spur connection module is mounted between the trunk connection means and the trunk connection bus.

9. A Fieldbus system comprising a Fieldbus trunk and spurs connected thereo, which system is provided with a modular Fieldbus segment protector for mounting between the Fieldbus trunk and the Fieldbus spurs connected to the Fieldbus trunk, in which the Fieldbus segment protector comprises a support means provided with trunk connection means for connecting to the Fieldbus trunk, a trunk connection bus and a plurality of spur outlets for connecting to the Fieldbus spurs, in which the support means comprises a plurality of separate backplanes each carrying a trunk connection bus and one spur outlet, in which the trunk connection means comprises connectors adapted to connect each of the plurality of backplanes to said Fieldbus trunk, said connectors connecting one backplane to another such that said trunk connection bus runs through said backplanes, and so any number of backplanes are daisy-chainable together, in which one or more of the plurality of backplanes carry an autonomous and self-contained fault isolation means removably mounted thereon, in each case between the trunk connection bus and the particular spur outlets of that backplane, such that the fault isolation means are removable from the backplanes, are movable about between the backplanes, are applied to the spur outlets thereof as required, and can isolate separate spurs of the Fieldbus segment without affecting other spurs.

\* \* \* \* \*